United States Patent [19]
Kapuscinski et al.

[11] Patent Number: 5,520,829
[45] Date of Patent: May 28, 1996

[54] LUBRICATING OIL CONTAINING DISPERSANT VISCOSITY INDEX IMPROVER

[75] Inventors: Maria M. Kapuscinski, Carmel; Christopher S. Liu, Poughkeepsie; Larry D. Grina, Wappingers Falls; Ronald E. Jones, Glenham, all of N.Y.

[73] Assignee: Texaco Inc., White Plains, N.Y.

[21] Appl. No.: 371,085

[22] Filed: Jan. 10, 1995

Related U.S. Application Data

[63] Continuation of Ser. No. 948,049, Sep. 21, 1992, abandoned, which is a continuation of Ser. No. 726,566, Apr. 24, 1985, abandoned.

[51] Int. Cl.$^6$ ...................... C10M 105/56; C10M 105/12
[52] U.S. Cl. ...................... 252/48.2; 252/51.5 A; 252/51.5 R; 252/52 R; 526/260; 526/265; 544/162; 544/170; 544/171; 544/326; 544/336; 544/398; 246/312; 246/329; 246/348; 548/530; 548/561; 548/579
[58] Field of Search ...................... 252/48.2, 51.5 A, 252/51.5 R, 52 R; 526/260, 265; 546/312, 329; 544/170, 171, 326, 336, 398, 162; 564/349; 548/530, 561, 579

[56] References Cited

U.S. PATENT DOCUMENTS

| | | | |
|---|---|---|---|
| 2,838,456 | 6/1958 | Banes et al. | 252/50 |
| 2,901,458 | 8/1959 | Banes et al. | 252/50 |
| 3,484,857 | 12/1969 | Anderson | 252/51.5 A |
| 3,506,574 | 4/1970 | Stambaugh et al. | 252/51.5 A |
| 3,842,010 | 10/1974 | Pappos et al. | 252/51.5 R |
| 3,931,075 | 1/1976 | Trecker et al. | 544/171 |
| 4,068,058 | 1/1978 | Engel | 252/51.5 A |
| 4,132,661 | 1/1979 | Waldillig et al. | 252/51.5 A |
| 4,139,480 | 2/1979 | Gardiner | 252/51.5 A |
| 4,146,489 | 3/1979 | Stambaugh et al. | 252/51.5 R |
| 4,259,086 | 3/1981 | Machleder et al. | 252/51.5 R |
| 4,510,063 | 4/1985 | Chou et al. | 252/51.5 R |
| 4,816,172 | 3/1989 | Kapuscinski et al. | 252/47 |
| 4,842,756 | 6/1989 | Liu et al. | 252/48.2 |
| 4,877,834 | 10/1989 | Liu et al. | 252/51.5 A |

OTHER PUBLICATIONS

CA 85: 193,185a, Paul et al., vol. 85, p. 1976.

Kirk–Othmer, *Encyclopedia of Chemical Technology*, 2nd Edition, vol. 8, John Wiley & Sons, New York, pp.269–275 (1965) Ibid,vol.20, p. 211 (1970).

*Primary Examiner*—Margaret Medley
*Attorney, Agent, or Firm*—George J. Darsa

[57] ABSTRACT

Lube oils of improved properties contain ethylene-propylene copolymer bearing moieties derived from the reaction product of allyl glycidyl ether and a heterocyclic amine such as N-(3-aminopropyl) morpholine.

23 Claims, No Drawings

LUBRICATING OIL CONTAINING DISPERSANT VISCOSITY INDEX IMPROVER

This is a continuation of application Ser. No. 07/948,049 filed Sep. 21, 1992, now abandoned, which is a continuation of application Ser. No. 06/726,566, filed Apr. 24, 1985, now abandoned.

FIELD OF THE INVENTION

This invention relates to lubricating oils. More particularly it relates to lubricating compositions characterized by improved dispersancy and viscosity index.

BACKGROUND OF THE INVENTION

As is well known to those skilled in the art, it is possible to improve the properties of a lubricating oil by addition of various components. The viscosity index may be improved; the dispersancy may be improved. Continued efforts are being made to attain improvement in these and other properties, and to attain these improvements at reduced cost. It is an object of this invention to provide an improved lubricating composition. Other objects will be apparent to those skilled in the art.

STATEMENT OF THE INVENTION

In accordance with certain of its aspects, this invention is directed to a method which comprises reacting (i) a first reactant containing ethylenic unsaturation and an epoxide moiety with (ii) a second reactant containing an $—NH_2, —NHR^{iv}, —OH, —SH,$ or $—COOH$ group wherein $R^{iv}$ is an alkyl, aralkyl, alkaryl, cycloalkyl, or aryl hydrocarbon group thereby forming a monomer containing ethylenic unsaturation; and recovering said monomer containing ethylenic unsaturation.

DESCRIPTION OF THE INVENTION

The first reactant which may be employed in practice of the process of this invention contains ethylenic unsaturation and an epoxide moiety.

Preferably the first reactant may be characterized by the formula:

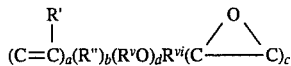

wherein $C=C$ is an ethylenically unsaturated double bond;

$R^v$ or $R^{vi}$ is a divalent hydrocarbon moiety selected from the group consisting of alkylene, alkarylene, aralkylene, cycloalkylene, and arylene;

$R'$ is hydrogen or alkyl, alkaryl, aralkyl, cycloalkyl, or aryl;

$R''$ is a divalent moiety selected from the group consisting of $—COO—$ and $—R^v—$; and a is an integer greater than 0;
b is an integer 0–1;
c is an integer 1–3; and
d is an integer 0–1.

In the above formula, $R'$ may be hydrogen or a hydrocarbon selected from the group consisting of alkyl, aralkyl, cycloalkyl, aryl, and alkaryl, including such radicals when inertly substituted. When $R'$ is alkyl, it may typically be methyl, ethyl, n-propyl, iso-propyl, n-butyl, i-butyl, sec-butyl, amyl, octyl, decyl, octadecyl, etc. When $R'$ is aralkyl, it may typically be benzyl, beta-phenylethyl, etc. When $R'$ is cycloalkyl, it may typically be cyclohexyl, cycloheptyl, cyclooctyl, 2-methylcycloheptyl, 3-butylcyclohexyl, 3-methylcyclohexyl, etc. When $R'$ is aryl, it may typically be phenyl, naphthyl, etc. When $R'$ is alkaryl, it may typically be tolyl, xylyl, etc. $R'$ may be inertly substituted i.e. it may bear non-reactive substituent such as alkyl, aryl, cycloalkyl, etc. Typically inertly substituted $R'$ groups may include 4-methyl cyclohexyl, etc. The preferred $R'$ groups may be lower alkyl, i.e. $C_1–C_{10}$ alkyl, groups including e.g. methyl, ethyl, n-propyl, i-propyl, butyls, amyls, hexyls, octyls, decyls, etc.

In the above formula, $R^v$ or $R^{vi}$ or may be a divalent hydrocarbon radical selected from the group consisting of alkylene, aralkylene, cycloalkylene, arylene, and alkarylene including such radicals when inertly substituted. When $R^v$ or $R^{vi}$ is alkylene, it may typically be methylene, ethylene, n-propylene, iso-propylene, n-butylene, i-butylene, sec-butylene, amylene, octylene, decylene, octadecylene, etc. When $R^v$ or $R^{vi}$ is aralkylene, it may typically be benzylene, beta-phenylethylene, etc. When $R^v$ or $R^{vi}$ is cycloalkylene, it may typically be cyclohexylene, cycloheptylene, cyclooctylene, 2-methylcycloheptylene, 3-butylcyclohexylene, 3-methylcyclohexylene, etc. When $R^v$ or $R^{vi}$ is alkarylene, it may typically be tolylene, xylylene, etc. $R^{vi}$ may be inertly substituted i.e. it may bear a non-reactive subsitutent such as alkyl, aryl, cycloalkyl, ether, etc. Typically inertly substituted $R^v$ or $R^{vi}$ groups may include 2-ethoxyethylene, carboethoxymethylene, 4-methyl cyclohexylene, etc. The preferred $R^v$ or $R^{vi}$ groups may be lower alkyl, i.e. $C_1–C_{10}$ alkylene, groups including e.g. methylene, ethylene, n-propylene, i-propylene, butylene, amylene, hexylene, octylene, decylene, etc. $R^v$ and $R^{vi}$ may typically be methylene $—CH_2—$.

In the above formula, $R''$ is a divalent moiety selected from the group consisting of $—COO—$ and $—R^v—$. Preferably $R''$ is $—COO—$.

a is an integer, greater than 0; and preferably a is 1. It is preferred that the double bond be not on the carbon atom which forms the epoxy ring. Preferably there is only one ethylenic double bond in the molecule; and when there are more, it is preferred that they be separated i.e. not adjacent or conjugated.

b is an integer 0–1. When b is 0 and d is 1, it will be apparent that the composition includes an ether moiety. When b is 1 and d is 0, the composition includes an ester moiety if $R''$ is $—COO—$.

c is an integer 1–3. Preferably c is 1.

d is an integer 0–1. When b and d are both zero, the composition includes a hydrocarbon moiety.

In its preferred aspects, the first reactant may be characterized by the formula

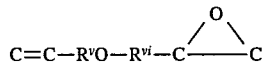

Typical first reactants may include the following:

TABLE allyl glycidyl ether
2-methallyl glycidyl ether
glycidyl methacrylate
p-glycidyl styrene
styrene-p-glycidyl ether
3,4-epoxy-1-pentene
3,4-epoxy-1-butene The preferred first reactant is allyl glycidyl ether.

The second reactant which may be employed in practice of the process of this invention contains an active group selected from the group consisting —$NH_2$, —$NHR^{iv}$, —OH, —COOH, or —SH.

In the above compound $R^{iv}$ may be a hydrocarbon selected from the group consisting of alkyl, aralkyl, cycloalkyl aryl, and alkaryl, including such radicals when inertly substituted. When $R^{iv}$ is alkyl, it may typically be methyl, ethyl, n-propyl, iso-propyl, n-butyl, i-butyl, sec-butyl, amyl, octyl, decyl, octadecyl, etc. When $R^{iv}$ is cycloalkyl, it may typically be cyclohexyl, cycloheptyl, cyclooctyl, 2-methylcycloheptyl, 3-butylcyclohexyl, 3-methylcyclohexyl, etc. When $R^{iv}$ is aryl, it may typically be phenyl, naphthyl, etc. When $R^{iv}$ is alkaryl, it may typically be tolyl, xylyl, etc. $R^{iv}$ may be inertly substituted i.e. it may bear a non-reactive substituent such as alkyl, aryl, cycloalkyl, ether, etc. Typically inertly substituted $R^{iv}$ groups may include 2-ethoxyethyl, carboethoxymethyl, 4-methyl cyclohexyl, etc. The preferred $R^{iv}$ groups may be lower alkyl, i.e. $C_1$–$C_{10}$ alkyl, groups including e.g. methyl, ethyl, n-propyl, i-propyl, butyls, amyls, hexyls, octyls, decyls, etc. $R^{iv}$ may typically be n-propyl.

In its preferred aspects, the second reactant may be characterized by the formula

HXR'''

In the above compound, R''' may be hydrogen or a heterocyclic group or a hydrocarbon radical selected from the group consisting of alkyl, aralkyl, cycloalkyl, aryl, and alkaryl, including such radicals when inertly substituted. When R''' is alkyl, it may typically be methyl, ethyl, n-propyl, iso-propyl, n-butyl, i-butyl, sec-butyl, amyl octyl, decyl, octadecyl, etc. When R''' is aralkyl, it may typically be benzyl, beta-phenylethyl, etc. When R''' is cycloalkyl, it may typically be cyclohexyl, cycloheptyl, cyclooctyl, 2-methylcycloheptyl, 3-butylcyclohexyl, 3-methylcyclohexyl, etc. When R''' is aryl, it may typically be phenyl, naphthyl, etc. When R''' is alkaryl, it may typically be tolyl, xylyl, etc. R''' may be inertly substituted i.e. it may bear a non-reactive substituent such as alkyl, aryl, cycloalkyl, ether, etc. Typically inertly substituted R''' groups may include 2-ethoxyethyl, carboethoxymethyl, 4-methylcyclohexyl, etc. The preferred hydrocarbon R''' groups may be lower alkyl, i.e. $C_1$–$C_{10}$ alkyl, groups including e.g. methyl, ethyl, n-propyl, i-propyl, butyls, amyls, hexyls, octyls, decyls, etc. When R''' is a hydrocarbon it may typically be n-propyl.

When R''' is heterocyclic, it may typically be for example in the form of a five or six membered ring containing one or more heterocyclic non-carbon atoms such as N, O, S, etc. Illustrative rings may include furan, thiophene, pyrole, imidazole, thiazole, coumarone, thianaphthalene, indole, pyran, pyridine, quinoline, isoquinoline, morpholine, pyrimidine, piperazine, etc. including such rings when hydrogenated or inertly substituted. Preferred are the morpholine, piperazine, and pyrimidine rings.

In the above compound, X may be —COO—, —S—, —$NR^{iv}$, $NH^{iv}$, —O— or —N. The nitrogen or sulfur or oxygen may be a portion of a heterocyclic ring; or it may be e.g. an —$NR^{iv}$ group pendent thereon.

Typical HXR''' compounds may be as follows:

TABLE

N-(3-aminopropyl) morpholine
morpholine
2-6-dimethyl morpholine
2-amino-3-picoline
4-amino-2,6 dimethyl pyrimidine
pyrimidine
N-hydroxyethyl piperazine
2-amino benzothiazole
N-methyl piperazine
N-(3-aminopropyl)-2-pipecoline
pyrrolidine
N-(3-aminopropyl) pyrrolidone
2-amino pyrimidine
2 mercapto pyrimidine
1-(2-dimethylamino-ethyl)-
5-mercapto-tetrazole
2,5-dimethylaniline
tetrazole-1-acetic acid
water
hydrogen sulfide
methyl mercaptan
thiophenol
ethanol Reaction to prepare the monomer according to the process of this invention may be carried out by adding the first and second reactants, preferably in about equimolar quantities to a reaction vessel with agitation. When HXR''' has a melting point above room temperature, it is preferable to carry out the reaction in a diluent-solvent having a boiling point of 80° C.–200° C. Typical solvents may include tetrahydrofuran, octanol, isopropanol, dioxane, N,N-dimethylacetamide, etc. The preferred solvents may be commercial tetrahydrofuran, octanol, or N,N-dimethyl acetamide. Reaction is carried out at 60° C.–150° C., say about 110° C. over 0.5–5 hours, say 2 hours. the product is cooled to room temperature and may be used without further purification or treatment.

Reaction typically proceeds as follows:

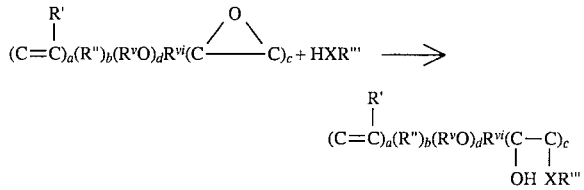

or more preferably

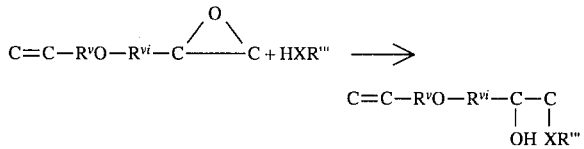

In a typical specific embodiment, the reaction may be:

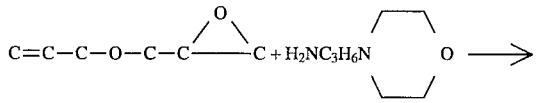

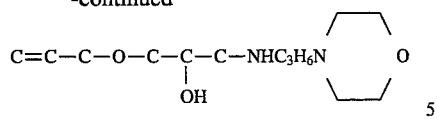

Typical specific monomer products which may be prepared may include the following.

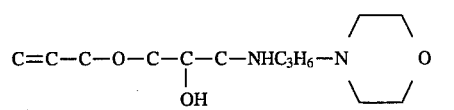 A.

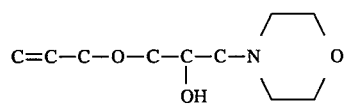 B.

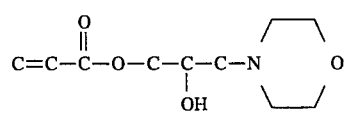 C.

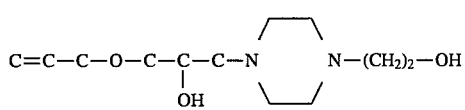 D.

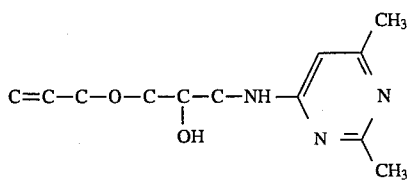 E.

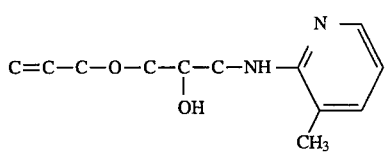 F.

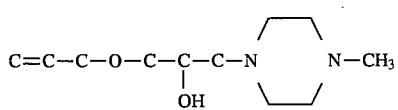 G.

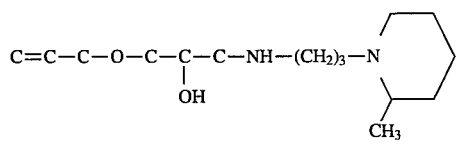 H.

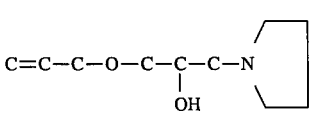 I.

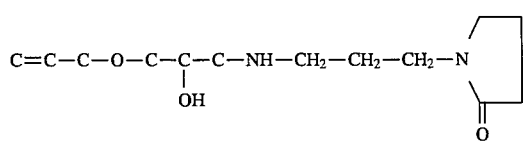 J.

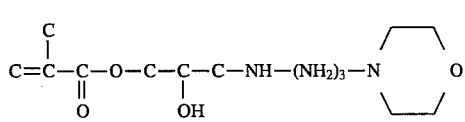 K.

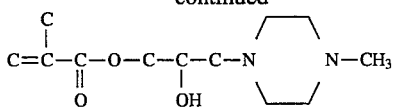 L.

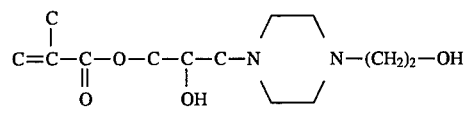 M.

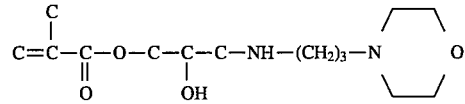 N.

In accordance with the process of this invention, the so prepared monomers may be converted into a functionalized polymer. This may be effected by polymerizing the monomer to form a polymer:

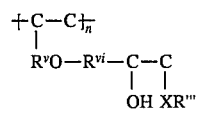

In another embodiment, the so prepared multifunctional monomer may be copolymerized with an ethylenically unsaturated polymerizable monomer (which forms a carbon-to-carbon backbone chain polymer containing residual unsaturation) having the formula

wherein A may be hydrogen; hydrocarbon typified by methyl, ethyl, phenyl, etc; halogen typified by chloride; —COOR* typified by —COOCH$_3$; etc. R* may be selected from the same group as is $R^{iv}$. R* is typically methyl.

Illustrative monomers which may be copolymerized may include ethylene, propylene, butylenes; vinyl chloride; styrene; methyl acrylate; methyl methacrylate; etc. When reaction is effected by copolymerization, the product polymer may be

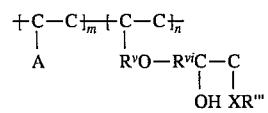

In this formula, m may be 50–2000, preferably 50–1000, say 80 and n may be 5–200, preferably 5–100, say 8. The monomers of this invention may be present in amount of 0.5–30 mole %, preferably 1–6 mole %, say 4 mole % of the total polymer.

Polymerization of the dispersant monomer to form polymer may be effected as by homogeneous polymerization in the presence of free radical catalyst (e.g. azobisisobutyronitrile) in solvent at 60° C.–100° C., say 80° C. In a typical reaction, a solution containing 50 parts of monomer in 50 parts of mineral oil plus 0.13 parts of free-radical catalyst (e.g. azobisisobutyronitrile) may be maintained in the presence of nitrogen at 80° C. and 15 psig for 2 hours to yield 50 parts of product polymer of $\overline{M}_n$ of 10,000–200,000, say 100,000.

Copolymerization of the dispersant monomer with a copolymerizable monomer may be effected under generally the same conditions. When the copolymerizable monomer is a liquid e.g. methyl methacrylate, it may be added to the reaction vessel ab initio. Where the copolymerizable monomer is a gas, e.g. ethylene or propylene, it may be admitted over the course of the reaction which is carried out at high pressure (typically 10,000–40,000 psig) in the presence of Zeigler-Natta catalyst. Product copolymer may contain 0.5–30 mole %, preferably 1–10 mole %, say 8 mole % of groups derived from the dispersant monomer. The molecular weight $\overline{M}_n$ of the product may vary depending upon the reaction conditions and the copolymerizable monomer. Generally it will be 10,000–200,000, preferably 20,000–150,000, say 80,000.

The dispersant monomers may (in the preferred embodiment) be grafted onto polymer in the presence of a free-radical initiator to form dispersant units on the polymer:

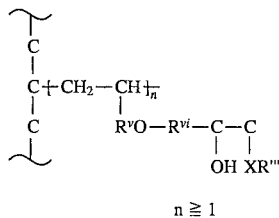

$n \geq 1$

The polymers, onto which the dispersant monomers of this invention may be grafted, may include an oil-soluble, substantially linear, carbon-carbon backbone polymer. Typical carbon-carbon backbone polymers prepared from monomers bearing an ethylenically unsaturated polymerizable double bond which may be employed include homopolymers or copolymers prepared from monomer

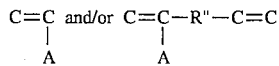

wherein A may be: hydrogen; hydrocarbon such as alkyl, aryl, etc.; phenyl; acetate or less preferred acyloxy (typified by —COOR); halide; etc. R" may be divalent hydrocarbon typified by alkylene, alkarylene, aralkylene, cycloalkylene, arylene, etc.

Illustrative of such monomers may be acrylates, methacrylates, vinyl halides (such as vinyl chloride), styrene, olefins such as propylene, butylene, etc., vinyl acetate; dienes such as butadiene, isoprene, hexadiene, ethylidene norbornene, etc. Homopolymers of olefins, (such as polypropylene, polybutylene, etc.), dienes, (such as hydrogenated polyisoprene), or copolymers of ethylene with e.g., butylene and higher olefins, styrene with isoprene and/or butadiene may be employed. The preferred carbon-carbon backbone polymers include those selected from the group consisting of ethylene-propylene copolymers (EPM or EPR) and ethylene-propylene-diene third monomer terpolymers (EPDM or EPT).

When the charge polymer is an ethylene-propylene copolymer (EPM, also called EPR polymers), it may be formed by copolymerization of ethylene and propylene under known conditions preferably Ziegler-Natta reaction conditions. The preferred EPM copolymers contain units derived from ethylene in amount of 40–70 mole %, preferably 50–60 mole %, say 55 mole %, the remainder being derived from propylene.

The molecular weight $\overline{M}_n$ of the EPM copolymers which may be employed may be 10,000–1,000,000, preferably 20,000–200,000, say 140,000. The molecular weight distribution may be characterized by $\overline{M}_w/\overline{M}_n$ of less than about 15, preferably 1.2–10, say 1.6.

Illustrative EPM copolymers which may be employed in practice of the process of this invention may be those set forth in the following table, the first listed being preferred:

A. The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a $\overline{M}_w/\overline{M}_n$ of 1.6.

B. The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5.

C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5;

When the charge polymer is a terpolymer of ethylene-propylene-diene third monomer (EPT or EPDM), it may be formed by copolymerization of ethylene, propylene and diene third monomer. The third monomer is commonly a non-conjugated diene typified by dicyclopentadiene; 1,4-hexadiene; or ethylidene norbornene. Polymerization is effected under known conditions generally comparable to those employed in preparing the EPM products. The preferred terpolymers contain units derived from ethylene in amount of 40–70 mole %, preferably 50–65 mole %, say 60 mole % and units derived from the propylene in amount of 20–60 mole %, preferably 30–50 mole %, say 38 mole % and units derived from third diene monomer in amount of 0.5–15 mole %, preferably 1–10 mole %, say 2 mole %. The molecular weight $\overline{M}_n$ of the terpolymers may typically be 10,000–1,000,000, preferably 20,000–200,000, say 120,000. Molecular weight distribution of the useful polymers is preferably narrow viz a $\overline{M}_w/\overline{M}_n$ of typically less than 15, preferably 1.5–10, say 2.2.

Illustrative EPT terpolymers which may be employed in practice of the process of this invention may be those set forth in the following table, the first listed being preferred:

TABLE

A. The Epsyn 4006 brand of EPT marketed by Copolymer Rubber and Chemical Corp., containing 58 mole % of units derived from ethylene, 40 mole % of units derived from propylene, and 2 mole % of units derived from ethylidene norbornene and having a $\overline{M}_n$ of 120,000 and a polydispersity index $\overline{M}_w/\overline{M}_n$ of 2.2.

B. The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 75,000 and a polydispersity index $\overline{M}_w/\overline{M}_n$ of 2.

C. The Ortholeum 2052 brand of EPT marketed by DuPont containing 62 mole % of units derived from ethylene, 36 mole % of units derived from propylene, and 2 mole % of units derived from 1,4-hexadiene and having a $\overline{M}_n$ of 35,000 and a polydispersity $\overline{M}_w/\overline{M}_n$ of 2.

D. The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and a polydispersity index $\overline{M}_w/\overline{M}_n$ of 2.5.

E. The Epsyn 40A brand of EPT marketed by Copolymer Rubber and Chemical Corp., containing 60 mole % of units derived from ethylene, 37 mole % of units derived from propylene, and 3 mole % of units derived from ethylidene norbornene and having a $\overline{M}_n$ of 140,000 and a polydispersity index $\overline{M}_w/\overline{M}_n$ of 2.

The EPM and EPT polymers may contain minor portions (typically less than about 30%) of other units derived from other copolymerizable monomers.

The grafting reaction of the dispersant monomer may be carried out in the following manner. The polymer onto which the dispersant monomer is to be grafted is added to the diluent-solvent in the reaction vessel and heated at 80° C.–160° C. to form a homogenous solution. The dispersant monomer and free radical initiator in a molar ratio of monomer to initiator of 1:1–8:1, preferably 1.5:1–5:1 are added. The temperature of the solution is maintained above the decomposition temperature of the initiator for 0.25–5 hours, preferably 0.4–2 hours, under an inert atmosphere to form the desired product.

In a typical grafting reaction, a solution containing 25 parts of ethylene-propylene copolymer and 75 parts of solvent such as hexane or mineral oil is prepared. Then 2.5 parts of a dispersant monomer and 1 part of dicumyl peroxide are added and maintained in the presence of nitrogen at temperature of 155°±5° C. and atmospheric pressure (when mineral oil is a solvent) or a pressure of 200 psig (when hexane is the solvent) for 1 hour. Enough mineral oil is then added to obtain a fluid concentrate at room temperature. When the grafting is carried out in hexane, a stripping step is included.

The product grafted polymer may contain 0.3–20 mole %, preferably 0.5–10 mole %, say 2 mole % derived from the dispersant monomer.

Free radical initiators, such as dicumyl peroxide, dibenzoyl peroxide, di-t-butyl peroxide, azobisisobutyronitrile, diacetyl peroxide, t-butyl-peracetate, or diisopropyl peroxydicarbonate may be employed in the present process.

The novel polymer products of this invention are polymers containing a moiety derived from the dispersant monomer. It is a particular feature of this invention, when the product is to be used as a lubricating oil additive, that the polymer (ex dispersant monomer) be preferably one which is employed in lubricating oil to attain desired improvement e.g. as in viscosity index. Typical viscosity index improving polymers include polyolefins typified by EPR ethylene-propylene copolymers; EPT ethylene-propylene-third monomer (typically diene) polymers; ethylene-vinyl acetate copolymers; polymethacrylates, etc.

There may be imparted to this polymer (in addition to its VI improving properties) dispersant properties by the dispersant additive. This may be effected by: (i) mixing the polymerized dispersant additive with the VI-improving polymer; (ii) copolymerizing the dispersant monomer with the monomer from which the VI-improving polymer is formed; or (iii) grafting dispersant additive onto the VI-improving polymer. In this manner it is possible to attain a system characterized by both VI-improving properties and improved dispersancy properties.

The polymeric products of this invention may be added to lubricating oil compositions to impart thereto improvements in viscosity index and in dispersancy. Typical lubricating oils to which the additives of this invention may be added include summer or winter automotive lubricating oils, airplane engine oils, railway diesel oils, etc.—whether hydrocarbon derived or synthetic. Typically the polymer additive may be present in minor effective, viscosity index improving, amount of 0.1–20 w %, preferably 0.5–20 w %, say 1 w %. This may correspond to presence of groups derived from the dispersant monomer in amount of 0.01–0.6 w %, preferably 0.03–0.20 w %, say 0.08 w %.

Addition of the polymeric additive of this invention to a lubricating oil may be facilitated by use of a concentrate containing 2–30 w %, preferably 6–20 w %, say 9 w % of additive in a diluent-solvent which may in the preferred embodiment be the same as the lubricating oil in which the additive is to be formulated.

It is a feature of this invention that the improved lubricating oils are characterized by improved dispersancy as measured in the Bench VC Test. In the Bench VC Test, dispersancy relative to three references is tested. The reference blends are known to possess an excellent dispersancy, a good dispersancy, and a poor dispersancy. Better dispersants are characterized by lower ratings; and a rating at around the good standard is indicative of a promising candidate.

DESCRIPTION OF THE SPECIFIC EMBODIMENT

Practice of this invention will be apparent to those skilled in the art from the following wherein as elsewhere in this application, all parts are parts by weight unless otherwise specified. In all formulae, all unfilled valence bonds may be filled with hydrogen atoms or with inert substituents.

EXAMPLE I

In this example, 5.7 g (0.05 moles) of allyl glycidyl ether and 9.0 g (0.05 moles) of liquid N-(3-aminopropyl) morpholine are added to a reaction vessel. The system is purged with nitrogen and slowly heated to about 100° C. and then maintained at 100° C.–120° C. for one hour followed by cooling to room temperature. The product monomer is used for graft polymerization without further purification.

EXAMPLE II

In this example, the procedure of Example I is followed except that the amine is morpholine 4.4 g (0.05 moles).

EXAMPLE III

In this example, the procedure of Example I is followed except that the amine is 2,6-dimethyl morpholine 5.75 g (0.05 moles) added as a solution in 5.7 g of octanol.

EXAMPLE IV

In this example, the procedure of Example I is followed except that the amine is 2-amine-3-picoline 5.3 g (0.05 moles).

EXAMPLE V

In this example, the procedure of Example I is followed except that the amine is 4-amino-2,6-dimethyl pyrimidine 6.2 g (0.05 moles) added as a solution in 25.0 parts of octanol.

EXAMPLE VI

In this example, the procedure of Example I is followed except that the amine is N-methyl-piperazine 5.0 parts (0.05 moles).

EXAMPLE VII

In this example, the procedure of Example I is followed except that the amine is 1-(3-amino-propyl)-2-pipecoline 7.8 parts (0.05 moles).

EXAMPLE VIII

In this example, the procedure of Example I is followed except that the amine is N-hydroxy-ethyl-piperazine 6.5 parts (0.05 moles).

EXAMPLE IX

In this example, the procedure of Example I is followed except that the unsaturated epoxide is glycidyl methacrylate 7.1 parts (0.05 moles) and the amine is N-methyl-piperazine 5.0 parts (0.05 moles).

EXAMPLE X

In this example, the procedure of Example I is followed except that the unsaturated epoxide is glycidyl methacrylate 7.1 parts (0.05 moles) and the amine is 1-(3-amino-propyl)-2-pipecoline 7.8 parts (0.05 moles).

EXAMPLE XI

In this example, the procedure of Example I is followed except that the unsaturated epoxide is glycidyl methacrylate 7.1 parts (0.05 moles) and the amine is N-hydroxy-ethyl-piperazine 6.5 parts (0.05 moles).

EXAMPLE XII

In this example, the procedure of Example I is followed except that the unsaturated epoxide is glycidyl methacrylate 7.1 parts (0.05 moles).

EXAMPLE XIII

In this example, the procedure of Example I is followed except that the amine is pyrrolidine 3.5 parts (0.05 moles).

EXAMPLES XIV–XXVII

In each of Examples XIV–XXVII, the monomer product of one of Examples I–XIII is grafted onto an EPR ethylene-propylene copolymer ($\overline{M}_n$ 80,000) containing 60 mole % of units derived from ethylene and 40 mole % of units derived from propylene. The EPR is added as a 24 w % solution in hexane; the system is purged with nitrogen and heated to 155° C. at 200 psig. Monomer as prepared in Examples I–XIII is added followed by 25 w % dicumyl peroxide in hexane. The mixture is stirred at 155° C. for 1 hour and the solvent hexane is exchanged with 1076 parts of solvent neutral oil (SNO-5) to give a solution containing about 8.5 w % polymer. This solution is used as is for addition to lubricating oils and further testing. The amount of monomer and of dicumyl peroxide are shown in the Table infra.

EXAMPLES XXVIII–XLI

The products of Examples XIV–XXVII were tested for dispersancy by the Bench VC Test (BVCT), at a concentration of 10 wt. % in a fully formulated oil having the following properties and components:

TABLE

| Component | Parts by Wt. |
| --- | --- |
| Solvent neutral oil A | 75.25 |
| Solvent neutral oil B | 21.64 |
| Zinc Dialkyldithiophosphate | 1.22 |
| 4,4' dinonyldiphenylamine | .39 |
| Overbased magnesium sulfonate | 1.50 |
| Silicone antifoamant | 150 PPM |
| Viscosity Kin 40 C CS | 30.4 |
| Viscosity Kin 100 C CS | 5.33 |
| Pour Point, F | +10 |
| Ash Sulfated, % D874 | 0.88 |
| Phosphorus, % X-Ray | 0.12 |
| Sulfur, % X-Ray Total | 0.32 |
| Zinc, % X-Ray | 0.13 |
| Magnesium, % | 0.15 |
| CC Simulator-18C | 1400 |

Oil A had a sp. gr. 60°/60° F. of 0.858–0.868; Vis@100° F. of 123–133 SUS; Pour Point 0° F. Oil B had a sp. gr. 60°/60° F. of 0.871–0.887; Vis@100° F. of 325–350 SUS; Pour Point +10° F. Zinc salt is a salt of mixed alcohols - isopropanol and $P_2S_5$ product as described in U.S. Pat. No. 3,293,181. The overbased magnesium sulfonate had a TBN of 395 and is a salt of branched $C_{20}$–$C_{40}$ monoalkylbenzene sulfonic acid (MW 530–540) together with about 10% magnesium carbonate, 14% magnesium hydroxide and 4% magnesium sulfate.

As the next table shows, the VI improvers of Examples XIV–XXVII were good dispersants. Most of them performed better than the second good reference standard.

TABLE

| Example | Polymer Product Example | Monomer Product Example | Parts* | Dicumyl Peroxide Parts* | BVCT Sample Rating | Excellent | Good | Poor |
| --- | --- | --- | --- | --- | --- | --- | --- | --- |
| XXVIII | XIV | I | 6.0 | 2.4 | 31.5 | 13.3 | 48.3 | 74.9 |
| XXIX | XV | II | 6.0 | 2.4 | 49.5 | 14.1 | 54.1 | 77.2 |
| XXX | XVI | III | 6.0 | 2.4 | 55.9 | 14.7 | 47.2 | 68.8 |
| XXXI | XVII | IV | 20.0 | 8.0 | 32.7 | 16.8 | 41.5 | 60.6 |
| XXXII** | XVIII | V | 12.0 | 5.0 | 30.9 | 16.0 | 43.6 | 61.3 |
| XXXIII** | XIX | V | 6.0 | 2.4 | 37.9 | 19.8 | 44.2 | 61.7 |
| XXXIV | XX | VI | 6.0 | 2.4 | 44.1 | 8.9 | 27.4 | 73.0 |
| XXXV | XXI | VII | 10.0 | 4.0 | 28.2 | 9.0 | 23.0 | 66.0 |
| XXXVI | XXII | VII | 10.0 | 4.0 | 45.2 | 10.6 | 25.4 | 64.2 |
| XXXVII | XXIII | IX | 10.0 | 4.0 | 23.8 | 11.1 | 20.0 | 61.7 |
| XXXVIII | XXIV | X | 10.0 | 4.0 | 22.3 | 16.5 | 38.1 | 68.1 |
| XXXIX | XXV | XI | 10.0 | 4.0 | 34.2 | 9.5 | 32.0 | 68.0 |
| XL | XXVI | XII | 10.0 | 4.0 | 25.8 | 8.0 | 29.4 | 68.0 |
| XLI | XXVII | XIII | 15.0 | 6.0 | 39.9 | 9.8 | 37.2 | 56.6 |

*Parts per 100 parts of Polymer
**Example XXXIII is a duplication of Example XXXII with a Variation (as noted in the Table) of the parts of monomer and of dicumyl peroxide.

It will be apparent to those skilled in the art that the products of the instant invention are characterized by satisfactory ratings on the BVCT.

The products of Examples XIV, XV, XVII and XVIII containing grafted EPR were tested as viscosity index improvers in a conventional mineral lubricating oil at concentration of 11.5 wt. % (1 wt. % of grafted EPR). The results are shown in the following Table. As seen, the kinematic viscosity at 40° C. and 100° C. and thickening power at 100° C. for the grafted EPR's in Examples XIV–XVIII are comparable to those for ungrafted EPR in the commercial VI improver.

TABLE

| VI Improver Example | Example of Grafted Monomer | Kinematic Viscosity cSt 40° C. | Kinematic Viscosity cSt 100° C. | Thickening* Power 100° C. |
|---|---|---|---|---|
| Commercial | — | 69.0 | 11.5 | 6.7 |
| XIV | I | 68.2 | 11.2 | 6.4 |
| XV | II | 65.3 | 10.9 | 6.0 |
| XVII | IV | 68.0 | 11.2 | 6.4 |
| XVIII | V | 68.3 | 11.4 | 6.6 |

*Thickening power is a measure of increasing the kinematic viscosity of oil after addition of 11.5 wt. % of VI improver (1 wt. % polymer).

Although this invention has been illustrated by reference to specific embodiments, it will be apparent to those skilled in the art that various changes and modifications may be made which clearly fall within the scope of this invention.

What is claimed is:

1. A composition prepared by the method which comprises reacting allyl glycidyl ether with N-(3-aminopropyl) morpholine thereby forming product monomer containing ethylenic unsaturation and recovering said product monomer containing ethylenic unsaturation.

2. A lubricating oil composition containing a major portion of a lubricating oil and a minor dispersant effective amount of graft polymer comprising an oil-soluble, substantially linear, carbon-carbon backbone polymer having graft polymerized thereon units derived from the reaction product of (i) a first reactant containing a terminal ethylenic unsaturation group and a terminal expoxide moiety with (ii) a second reactant characterized by the formula HXR''' wherein R''' is hydrogen, alkyl, alkaryl, aralkyl, cycloalkyl, aryl, or 5 or 6 membered heterocyclic ring containing one or more heterocyclic N, O or S atoms; X is —COO—, —S—, —NR$^{IV}$, —NH, or —O— R$^{iv}$ is an alkyl, aralkyl, alkaryl, cycloalkyl, or aryl hydrocarbon group thereby forming a monomer containing ethylenic unsaturation; and recovering said monomer containing ethylenic unsaturation.

3. A lubricating oil composition as claimed in claim 2 wherein said backbone polymer is a copolymer of ethylene-propylene or of ethylene-propylene-diene third monomer.

4. A lubricating oil composition as claimed in claim 2 wherein the molecular weight $\overline{M}_n$ of said backbone polymer is 10,000–200,000.

5. A lubricating oil composition as claimed in claim 2 wherein said minor effective amount is 2–20 w %.

6. A lubricating oil composition as claimed in claim 2, wherein said second reactant is R''' COOH.

7. A lubricating oil composition as claimed in claim 2, wherein said second reactant is HSR'''.

8. A lubricating oil composition as claimed in claim 2, wherein said second reactant is HNR''' R$^{IV}$.

9. A lubricating oil composition as claimed in claim 2, wherein said second reactant is H$_2$O or H$_2$S.

10. A lubricating oil composition as claimed in claim 2, wherein said second reactant is a morpholine.

11. A lubricating oil composition as claimed in claim 2, wherein said second reactant is N-(3-amino-propyl) morpholine.

12. A lubricating oil composition as claimed in claim 2, wherein said first reactant is selected from the group consisting of allyl glycidyl ether, 2 methallyl glycidyl ether, glycidyl methacrylate, p-glycidyl styrene, styrene-p-glycidyl ether, 3,4-epoxy-1-pentene and 3,4-epoxy-1-butene.

13. A lubricating oil composition as claimed in claim 2, wherein said second reactant is selected from the group consisting of N-(3-aminopropyl) morpholine, morpholine, 2-6-dimethyl morpholine, 2-amino-3-picoline, 4-amino-2,6 dimethyl pyrimidine, pyrimidine, N-hydroxyethyl piperazine, 2-amino benzothiazole, N-methylpiperazine, N-(3-aminopropyl)-2-pipecoline, pyrrolidine, N-(3-aminopropyl)pyrrolidone, 2-amino pyrimidine, 2 mercapto pyrimidine, 1-(2-dimethylamino-ethyl)-5-mercapto-tetrazole, 2,5-dimethylaniline, tetrazole-1-acetic acid, water, hydrogen sulfide, methyl mercaptan, thiophenol, and ethanol.

14. A lubricating oil composition comprising a major portion of a lubricating oil and 0.1–10 w % of, as additive, a graft polymer comprising an oil-soluble, substantially linear, carbon-carbon backbone copolymer of ethylene propylene or a terpolymer of ethylene propylene-third diene monomer having graft polymerized thereon units derived from the reaction product of allyl glycidyl ether and N-(3-aminopropyl) morpholine.

15. A composition containing ethylenic unsaturation prepared by method which comprises reacting (i) a first reactant containing ethylenic unsaturation and an epoxide moiety with (ii) a second reactant containing an —NH$_2$—NHR$^{IV}$, —OH, —SH, or —COOH group wherein R$^{IV}$ is an alkyl, aralkyl, alkaryl, cycloalkyl, or aryl, hydrocarbon group thereby forming a monomer containing ethylenic unsaturation; and recovering said monomer containing ethylenic unsaturation.

16. A composition as claimed in claim 15 wherein said second reactant is R''' COOH.

17. A composition as claimed in claim 15 wherein said second reactant is HSR'''.

18. A composition as claimed in claim 15 wherein said second reactant is HNR''' R$^{IV}$.

19. A composition as claimed in claim 15 wherein said second reactant is H$_2$O or H$_2$S.

20. A composition as claimed in claim 15 wherein said second reactant is a morpholine.

21. A composition as claimed in claim 15 wherein said second reactant is N(3-amino-propyl) morpholine.

22. A composition as claimed in claim 15, wherein said first reactant is selected from the group consisting of allyl glycidyl ether, 2 methallyl glycidyl ether, glycidyl methacrylate, p-glycidyl styrene, styrene-p-glycidyl ether, 3,4-epoxy-1-pentene and 3,4-epoxy-1-butene.

23. A composition as claimed in claim 15, wherein said second reactant is selected from the group consisting of N-(3-aminopropyl) morpholine, morpholine, 2-6-dimethyl morpholine, 2-amino- 3-picoline, 4-amino-2,6 dimethyl pyrimidine, pyrimidine, N-hydroxyethyl piperazine, 2-amino benzothiazole, N-methyl piperazine, N-(3-aminopropyl)-2-pipecoline, pyrrolidine, N-(3aminopropyl)pyrrolidone, 2-amino pyrimidine, 2 mercapto pyrimidine, 1-(2-dimethylamino-ethyl)-5-mercapto-tetrazole, 2,5-dimethylaniline, tetrazole-1-acetic acid, water, hydrogen sulfide, methyl mercaptan, thiophenol, and ethanol.

* * * * *

UNITED STATES PATENT AND TRADEMARK OFFICE
CERTIFICATE OF CORRECTION

PATENT NO. : 5,520,829
DATED : May 28, 1996
INVENTOR(S) : Kapuscinski et al

It is certified that error appears in the above-indentified patent and that said Letters Patent is hereby corrected as shown below:

On title page, item [73]
IN THE ASSIGNEE:

Please change "Texaco, Inc., White Plains, N.Y." to

-- ETHYL ADDITIVES CORPORATION

Richmond, Virginia --.

Claim 15, column 14, line 5, after "containing" insert --a terminal--; after "unsaturation" insert --group--; delete "an" and insert --a terminal--;

UNITED STATES PATENT AND TRADEMARK OFFICE
CERTIFICATE OF CORRECTION

PATENT NO. : 5,520,829

DATED : May 28, 1996

INVENTOR(S) : Kapuscinski et al

It is certified that error appears in the above-identified patent and that said Letters Patent is hereby corrected as shown below:

Claim 15, column 14, line 7, delete "containing (thru) wherein" should read --characterized by the formula $HXR'''$ wherein $R'''$ is hydrogen, alkyl, alkaryl, aralkyl, cycloalkyl, aryl, or 5 or 6 membered heterocyclic ring containing one or more heterocyclic N, O or S atoms; X is -COO-, -S-, -$NR^{IV}$, -NH, or -O-; and--.

Signed and Sealed this

Twelfth Day of August, 1997

*Attest:*

BRUCE LEHMAN

*Attesting Officer*  *Commissioner of Patents and Trademarks*